Patented Dec. 4, 1951

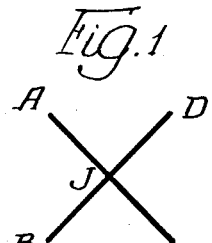
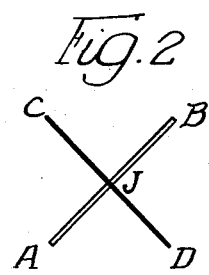
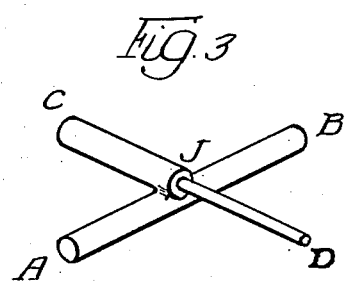
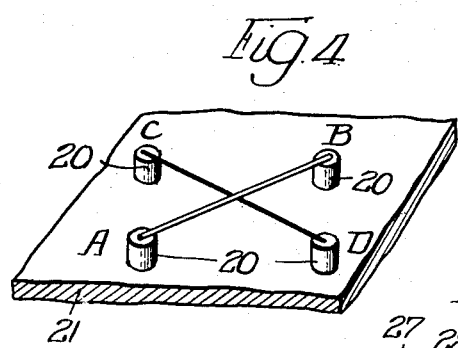
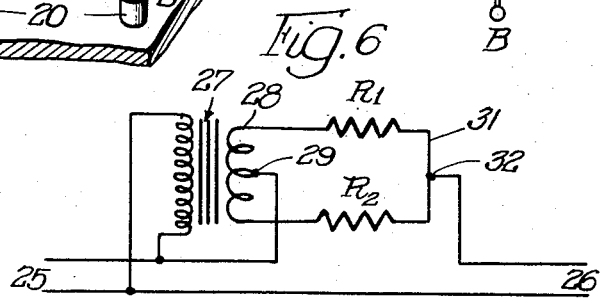
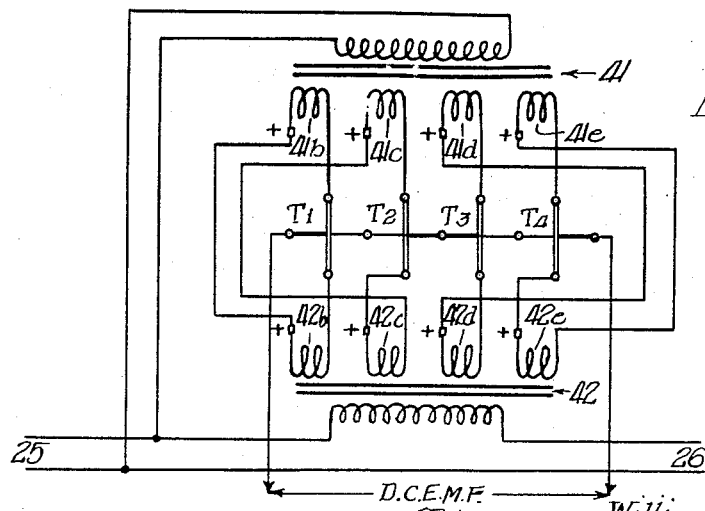

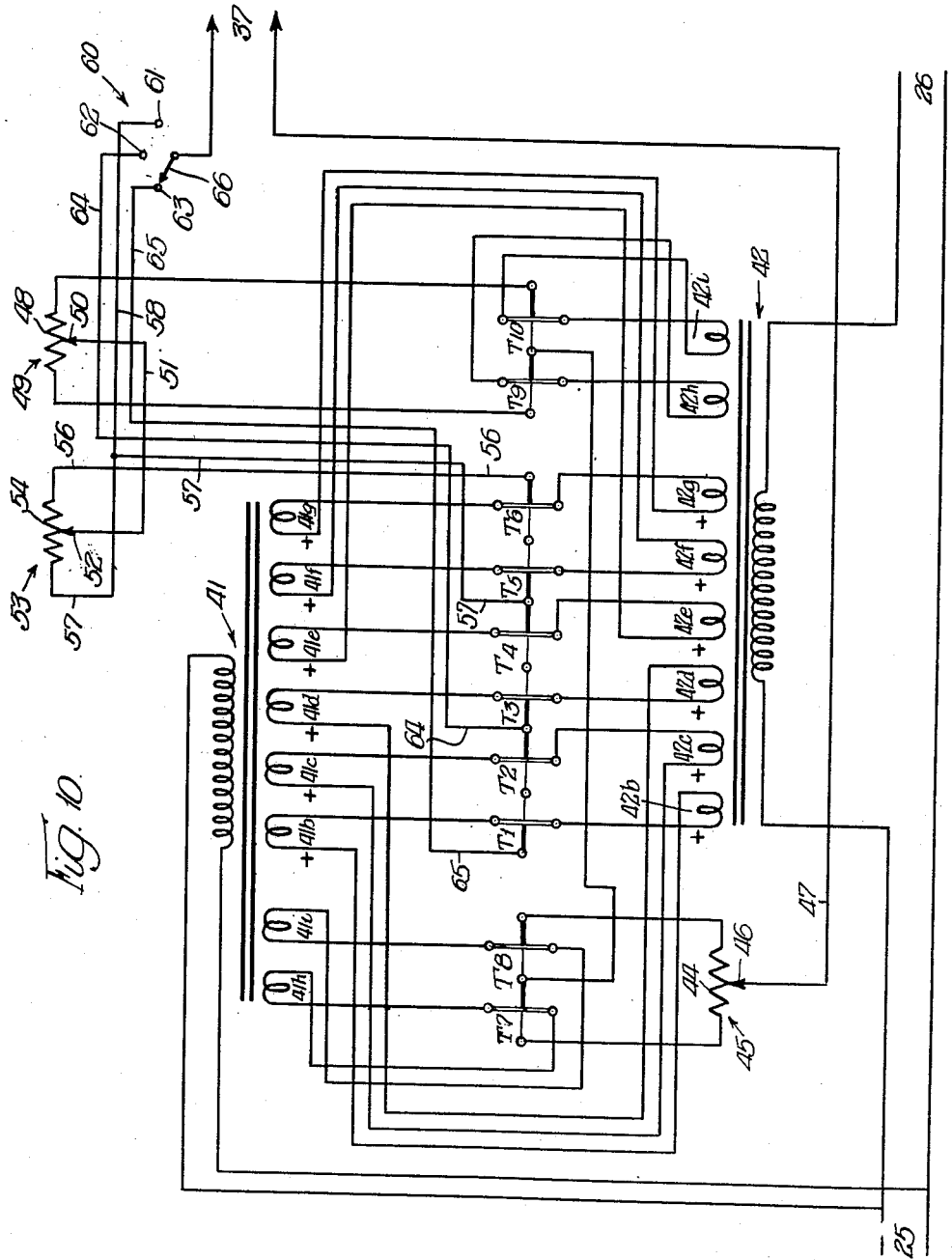

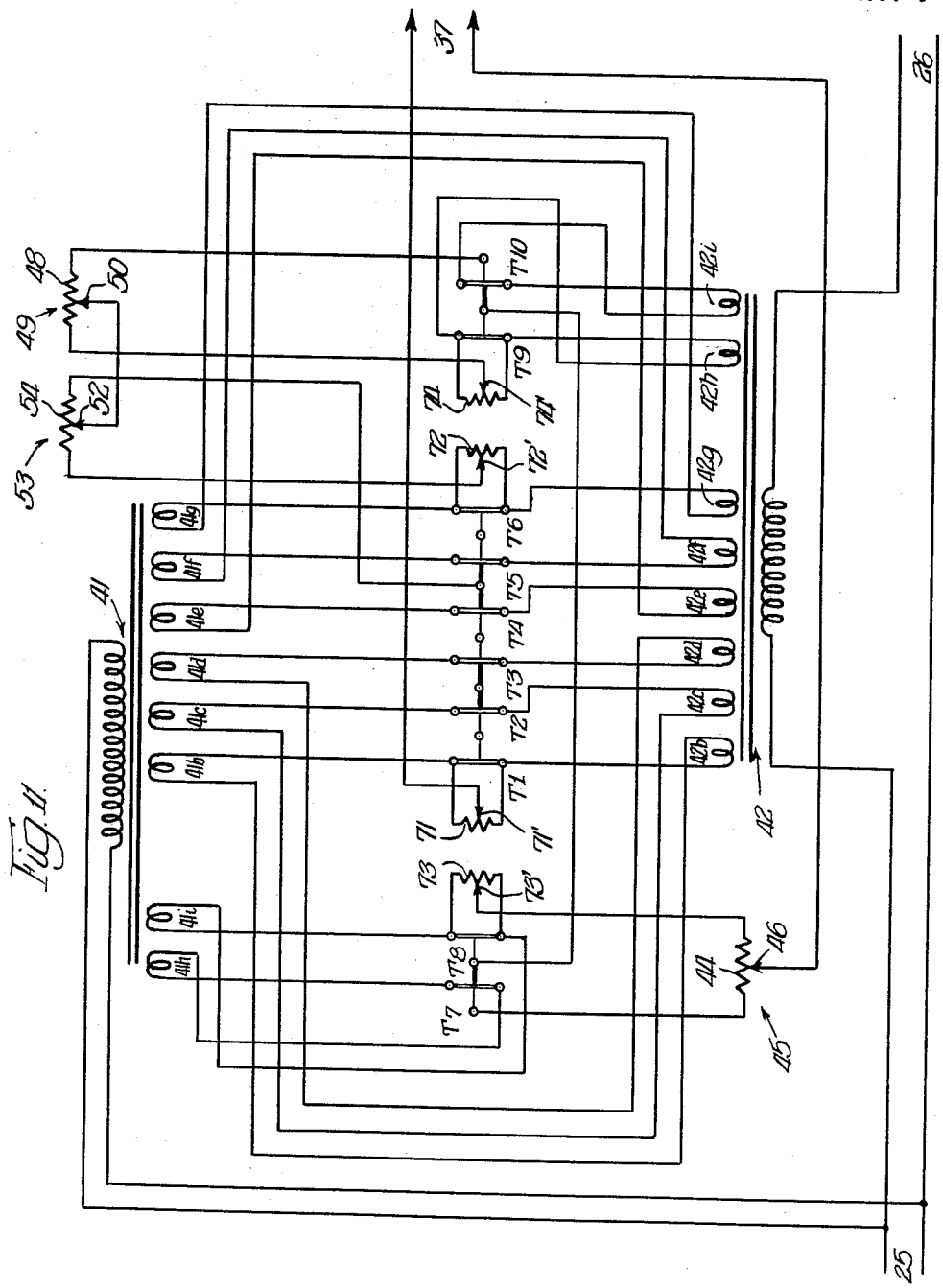

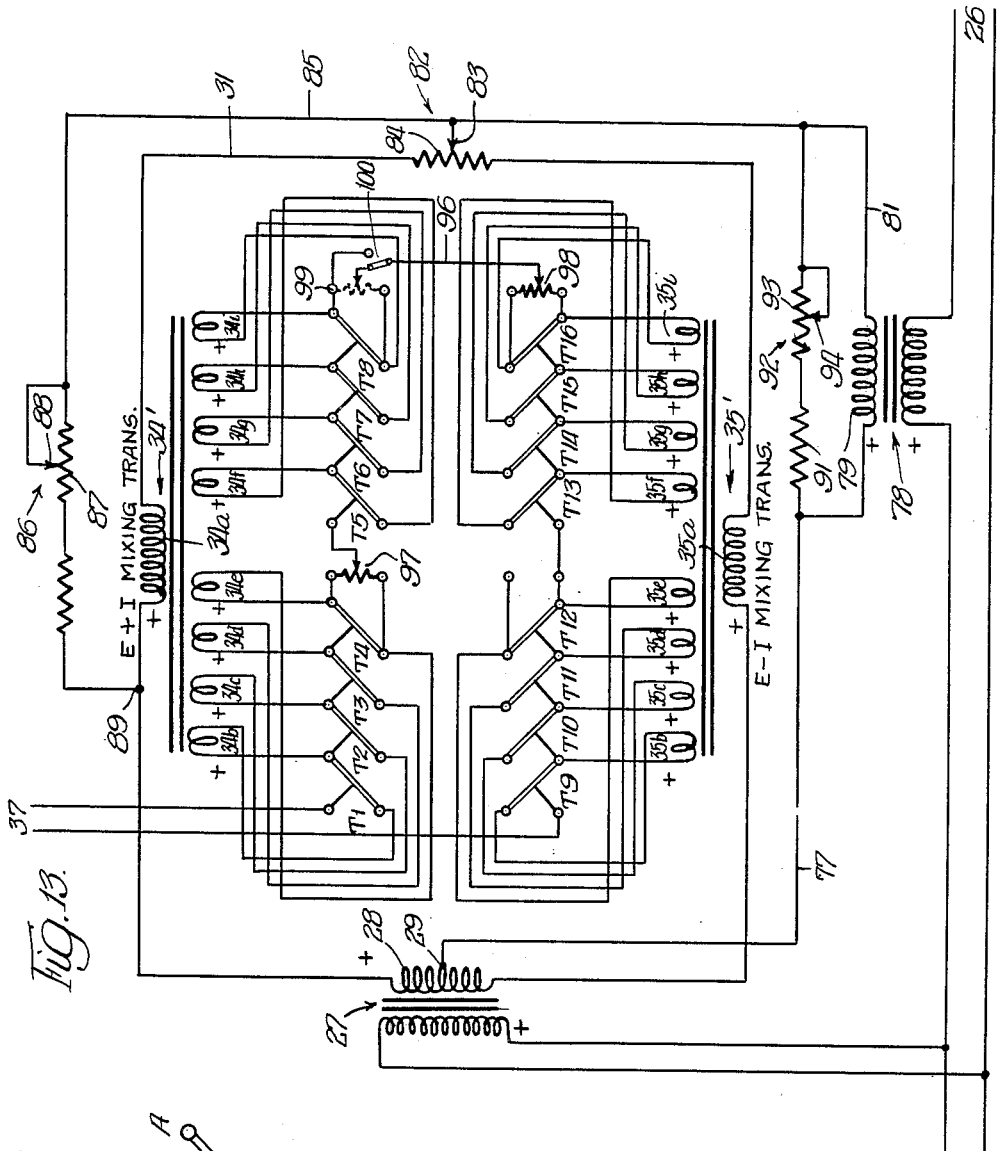

2,577,111

UNITED STATES PATENT OFFICE 2,577,111

THERMAL CONVERTER

William C. Downing, Jr., and Donald A. Eggleston, Springfield, Ill., and James M. Vanderleck, Toronto, Ontario, Canada, assignors to Sangamo Electric Company, Springfield, Ill., a corporation of Illinois Application August 28, 1948, Serial No. 46,674

27 Claims. (Cl. 171—97)

The present invention relates to a thermal converter, i. e. to a thermal converter type of electrical measuring device in which a direct current electromotive force is generated accurately proportional to an alternating current power which the thermal converter is connected to measure. Thermal converters are widely used in conjunction with indicating or recording potentiometers, millivoltmeters, etc. for totalizing, telemetering and various control functions of power systems. Furthermore, thermal converters are sometimes employed to measure other quantities than power, such as reactive power, voltamperes, voltage squared, or current squared. In any case, the general principle of operation is usually the same, viz, power from the measured circuit is employed to produce a temperature difference proportional to the measured quantity and this temperature difference is measured by one or more thermocouples. While the preferred embodiment of our invention is for the purpose of measuring power, we wish it to be understood that our invention can also be employed equally well for the measurement of other quantities.

In our improved thermal converter for measuring alternating current power, we take a predetermined proportion of this alternating current power from the measured circuit and employ it to heat the heater elements of thermocouple units for producing a temperature difference in the thermocouple units, which, in turn, produces a direct current which is employed in an instrument capacity for indicating or recording the alternating current power passing through the measured circuit. In one embodiment of our invention, these thermocouple units are of an improved contact type wherein the thermocouple element is directly heated by contact with the alternating current heater element at one point only, and wherein the thermocouple element is geometrically arranged substantially at right angles to this alternating current heater element. The purpose of this one point contact and right angle relation is to reduce to a minimum the amount of alternating current pick-up which may occur from the alternating current heater element to the direct current thermocouple element. This pick-up of alternating current components can be avoided in the indirectly-heated or separate-heater type of thermocouple unit wherein the alternating current input circuit is electrically insulated from the direct current output circuit. However, this indirectly-heated type has a very serious objection in that the interposing of insulation between the heater element and the thermocouple junction limits the efficiency and the speed of response of the thermal converter. In contrast to this, the directly heated type of thermocouple units which we employ, having their couples in direct contact with, or as a part of, the heaters, may be designed to respond more rapidly to changes in the measured load, and, in general, may be made to provide higher output E. M. F. In prior thermal converters of the directly heated type, the elimination of alternating current from the output circuit has presented quite a problem, being dependent upon the symmetry of the internal circuits and being difficult to obtain, even with adjustment. This is especially true when used in conjunction with automatic potentiometers of the electronic type, where an A. C. component is undesirable and should not exceed perhaps 1% of the direct current E. M. F. Substantially all of the adjusting and balancing difficulties of these prior art devices have been avoided by our improved point-contact, right angle design of thermocouple unit.

Another feature of our invention is that of conductively isolating the different thermocouple units by an improved arrangement of isolating transformers, or of isolating secondary windings on the potential and current transformers of the system.

Another feature of the invention resides in providing a thermal converter in which errors due to dissymmetry of the main heater elements and thermocouple elements are balanced out by the introduction, in series, of a portion of the electromotive force generated by supplementary or adjusting thermocouples which are heated, respectively, by currents proportional to the line voltage and to the line current.

In another embodiment of our invention we disclose a modified form of thermocouple unit in which part of the heater element of the unit also constitutes part of the thermocouple element. In this construction, there is some alternating current pick-up from the heater element to the thermocouple element, and one of the features of the invention is an improved circuit arrangement whereby this alternating current pick-up or component thus introduced is, for the most part, balanced out by the symmetry of the circuit.

Another feature of the invention is the provision of an improved thermal converter in which the heater element and the thermocouple element employ two or more materials having substantially different temperature coefficients of thermal conductivity, so that the relation between input watts and output electromotive force may be altered in design or in manufacture by so changing the dimensions of the conductors comprising the heater element or the thermocouple element as to change the proportion of the conductive heat flow through each material.

Other features, objects and advantages of the invention will appear from the following detail description of certain preferred embodiments of the invention. In the accompanying drawings illustrating such embodiments:

Figure 1 is a diagram of one form of thermocouple unit which may be used;

Figure 2 is a similar diagram of another form of thermocouple unit;

Figure 3 is a diagrammatic perspective view showing the right angle relation between the heater element and thermocouple element, and the contact therebetween at the thermocouple junction;

Figure 4 is a diagrammatic perspective view showing the mounting of one of the thermocouple units;

Figure 5 is a diagrammatic plan view illustrating the connecting of two thermocouple units as an opposing pair;

Figure 6 is a circuit diagram for purposes of explanation;

Figure 9 is a circuit diagram of one preferred form of our improved thermal converter wherein the isolating secondaries of the potential and current transformers are connected in alternating polarity so that the potential and current transformer voltages add or subtract in alternate heaters;

Figure 10 is a circuit diagram showing a further development of this thermal converter, including such additional features as a ratio adjustment, a current adjustment, a ratio selector and a potential adjustment;

Figure 11 is a circuit diagram showing the provision of an alternating current pick-up adjustment in the circuit;

Figure 12 is a diagrammatic view of another form of thermocouple unit in which part of the heater element constitutes part of the thermocouple element; and Figure 13 is a circuit diagram of another embodiment of our improved thermal converter employing this latter form of thermocouple unit.

Figure 7:
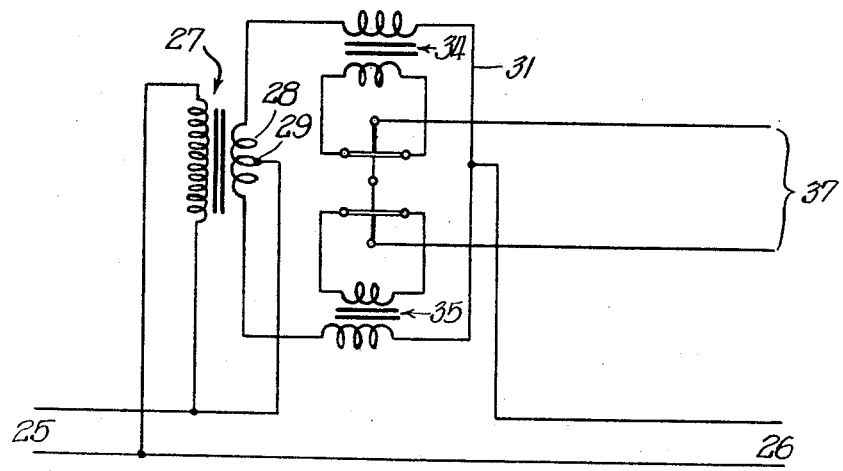
Figure 7 is a circuit diagram of substantially this same circuit arranged to act upon a pair of thermocouple units.

One simple form of thermocouple construction which we may employ in our improved thermal converter is represented by the well known "Peltier cross" shown in Figure 1. If two conductors AD and BC of dissimilar thermoelectric powers are joined in a cross, as shown in this figure, and if the A. C. heating current is connected to flow through the path AJB, then the junction J will be heated above the surrounding temperature, and a direct current electromotive force will appear between points C and D. In Figure 2, we have illustrated another form of thermocouple unit wherein the couple wire is formed by butt-welding together two wires of dissimilar thermoelectric power, and wherein the heater wire is disposed at right angles to this composite thermocouple wire and is spot-welded thereto as near as possible to the butt-welded junction of the thermocouple element. In this construction shown in Figure 2, CJ represents one of the wires of the thermocouple element and DJ the other wire. The heater wire is indicated at AJB. It will be seen that if an alternating current flows through the heater element AJB, the point J is heated and a direct current electromotive force appears between the extremities C and D of the thermocouple element. Figure 3 illustrates this form of thermocouple unit in exaggerated proportions. The two wires CJ and DJ making up the thermocouple element need not be of the same diameter. It will be understood that this thermocouple unit, comprising the thermocouple element and the heater element, can be made up in whole or in part from flat wire, punchings, etc., instead of entirely in round wire.

In Figure 4, we have diagrammatically illustrated a typical installation wherein the thermocouple cross or unit is shown as being supported from four terminals 20 mounted in close thermal association with, but electrically insulated from, a thermally conductive plate 21. This thermally conductive plate 21 serves as a "heat sink" and provides a common reference temperature for all thermocouples so mounted upon it. When heat is generated in the heater wire AB, the temperatures of the various portions rise until the loss of heat, by conduction to the four terminals 20, and by convection, balance the heat input, radiation being negligible. Properly designed, the terminals will remain at substantially the "sink" or reference temperature, and the junction will attain a temperature approaching the maximum existing in the heater wire. The electromotive force developed by the couple is thus seen to be a measure of the heat developed in the heater wire.

It is important in a thermal converter that the output E. M. F. be exactly or closely proportional to the quantity measured over a wide range of values, and under various conditions of temperature, etc. As we shall hereinafter describe, in our improved thermal converter, the differential heat input to the heater may be made to meet this condition accurately. However it remains to show that the E. M. F. generated is exactly proportional to the input to each heater. Several factors tend to cause variations from this desired condition, viz: the thermal conductivity of the conductors (both heater and couple wires) may vary with temperature; the heat loss by convection increases more rapidly than the temperature difference; and, most thermocouple materials do not provide an E. M. F. strictly proportional to temperature difference. For example, if the couple wire were composed of constantan and manganin, and the heater wire composed of constantan, all having approximately the same dimensions, it will be found that as the power measured increases, the increase in direct current E. M. F. generated will be slightly less than proportional. This effect is a combination of several factors. For example, as the load and the heat input increase, with consequent rise in temperature, the thermal conductivity of both alloys increases so that the heat loss by conduction increases more rapidly than the input. Also, heat loss by convection increases more rapidly than the input. Hence, the temperature of the junction rises less rapidly than the heat input, owing to both causes of heat loss. On the other hand, the E. M. F. of a constantan-manganin couple rises more rapidly than the temperature, and this tends to restore the desired linearity between E. M. F. and input. With this particular combination, the rising output E. M. F. versus temperature relation would nearly balance the falling temperature versus input relation if substantially all of the heat were conduction, but, in a practical design convection cannot be sufficiently reduced, by changing dimensions, etc., and therefore the output E. M. F. rises less rapidly than the input, giving a "falling load curve."

It appears then that some other combination of metals may be preferred to the above combination, such that the E. M. F. versus temperature characteristic rises more rapidly than the temperature versus conduction loss curve drops. The net tendency for the E. M. F. to rise more rapidly than the convective heat loss drop may be balanced against the tendency of the E. M. F. to rise less rapidly than the convective loss by proper proportioning of the elements. Molybdenum offers an excellent material in substitution for manganin for the reason that its E. M. F. against constantan rises more rapidly than temperature, and its thermal conductivity decreases with temperature. By using molybdenum, a curve of E. M. F. which rises more rapidly than heat input is readily obtained, and this permits the proportioning of these various factors to obtain an excellent load curve. For example, if due to variations in raw materials beyond manufacturing control, it were found that a falling load curve were obtained, this might be corrected by a slight change in the relative proportions of the constantan and molybdenum conductors to cause the latter to conduct away a slightly greater portion of the total heat. Molybdenum-constantant thermocouples may also be used in combination with other thermocouples which give a falling load curve, such as, for example, Chromel-constantan couples, to provide a net output E. M. F. which is linear over a wide range. In our preferred construction, we use #33 constantan for the heater and for half of the thermocouple wire, and we use #38 molybdenum for the remainder of the thermocouple. By way of illustrating preferred proportions for one embodiment of our device, we find that correct proportioning is obtained then by making the constantan lengths (from junction to terminal) each substantially 0.125 inch long, and the molybdenum leg of the couple substantially 0.225 inch long. It will be understood that these proportions and dimensions are given solely for the purpose of enabling one skilled in the art to make one embodiment of the invention with a minimum of trouble and inconvenience, and that the invention is not limited to such proportions and dimensions. As we shall hereinafter describe, in one preferred embodiment of our invention these thermocouple crosses are normally used in opposing pairs, i. e., the direct current polarity of one thermocouple of the pair is connected in opposition to the direct current polarity of the other thermocouple of the pair. For example, Figure 5 illustrates such an opposing pair of thermocouple crosses having a common terminal E, which may, with only slight effect, be omitted entirely.

Referring now to the circuits of our improved thermal converters, these circuits for producing heat input difference proportional to the power measured will be more easily understood by referring first to an explanatory fundamental circuit which is commonly used in thermal watt demand meters and is typically illustrated in Patent No. 1,765,563, issued to Borden et al. on June 24, 1930. Such explanatory circuit is shown in Figure 6 of the present drawings. The supply end of the line is indicated at 25 and the load circuit or load end of the line is indicated at 26. A potential transformer 27 is connected across the supply circuit and has a center tapped secondary 28, to which center tap 29 one side of the supply line is connected. A circuit 31 extends from the end terminals of the secondary 28 and passes through the two resistance elements R1 and R2. One side of the load circuit 26 taps off a balance point 32 of this resistor circuit. It will be seen that when potential E only is applied to this circuit of Figure 6, a current $$\frac{E}{2R}$$

is caused to circulate through R1 and R2 in series. If these two resistances are equal, the same heat is developed in each heater. On the other hand, if line current "I" only, without potential, passes through the circuit, it divides evenly between R1 and R2 and likewise produces the same heating effect in each heater. If current and potential are both applied, then the circulating current adds to half the line current in one heater and opposes it in the other; viz:

$$I_1 = \frac{E}{2R} + \frac{I}{2} \text{ and } I_2 = \frac{E}{2R} - \frac{I}{2}$$

The power developed in each heater, then, is:

$$I_1^2 R = \left(\frac{E}{2R} + \frac{I}{2}\right)^2 R \text{ and } I_2^2 R = \left(\frac{E}{2R} - \frac{I}{2}\right)^2 R$$

The difference of these two values is:

$$I_1^2 R - I_2^2 R = EI$$

The difference of the power in the two heaters R1 and R2 is thus shown to be proportional to the product $E \times I$ or the power measured. Since, in this analysis, E and I may be taken as instantaneous values, this automatically takes into account the power factor. It will be seen that if the temperature rise of each heater is proportional to the heat input, then the temperature difference between heaters is proportional to the power measured. A series of thermocouples, with their junctions alternately associated with each heater, would then measure this temperature difference and thus create an E. M. F. proportional to the load measured. However, it is not feasible to use such a circuit with thermocouples of the direct heated or direct contact type, since the alternating current and direct current circuits would then be connected at more than one point. In order to isolate the heater circuits of the thermocouples, we propose to use isolating transformers 34 and 35 in the heater circuit 31, as shown in Figure 7. In other respects, this circuit remains the same as shown in Figure 6. The primaries of the two isolating transformers 34 and 35 are interposed in series in the circuit 31, and the secondaries of these two isolating transformers are connected across the heater elements of the two thermocouples. These two thermocouples are shown as being connected in opposition, and their direct current output is transmitted over output circuit 37 to the responsive instrument, control device, or the like.

Figure 8:
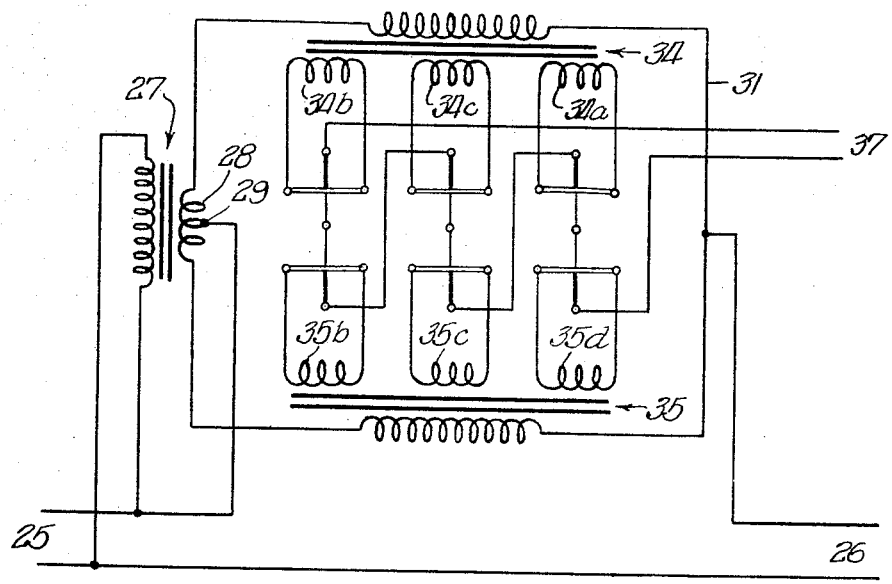
Figure 8 is a similar circuit diagram showing the circuit acting on a plurality of pairs of thermocouple units.

Referring now to Figure 8, where it is desired to employ more than one pair of thermocouples, a separate transformer or a separate transformer secondary may be provided for each heater. For example, the isolating transformer 34 is shown as being provided with three secondary windings 34b, 34c and 34d, and the other isolating transformer 35 is shown as being provided with a corresponding number of separate secondary windings 35*b*, 35*c* and 35*d*. These separate secondary windings are connected respectively across the heater elements of their corresponding pairs of thermocouples connected in opposition, and these three pairs of thermocouples are connected in series in the direct current output circuit 37.

In Figure 9 we have illustrated a different circuit arrangement in which the isolating secondary windings of a potential transformer and of a current transformer are connected in alternating polarity so as to add or subtract in alternate heaters. In this arrangement, there is provided a potential transformer 41 connected across the supply line 25, and a current transformer 42 connected in series with the load line 26. The potential transformer 41 has a plurality of separate isolating secondary windings 41*b*, 41*c*, 41*d* and 41*e*. Correspondingly, the current transformer 42 has a series of separate isolating secondary windings 42*b*, 42*c*, 42*d* and 42*e*. These companion pairs of isolating windings are connected alternately in bucking and boosting relation to the heating elements of the four thermocouple units T1, T2, T3 and T4. In this circuit diagram each of the eight isolating secondary winding 41*b*–41*e* and 42*b*–42*e* has a small + symbol at one end of the winding to signify the positive end of that winding (current leaving). It will hence be seen that the companion pair of windings 41*b* and 42*b* are connected in bucking or subtractive relation through the heating element of thermocouple T1; that the companion pair of secondary windings 41*c* and 42*c* are connected in boosting or additive relation through the heating element of thermocouple T2; that the companion pair of secondary windings 41*d* and 42*d* are connected in bucking or subtractive relation through the heating element of thermocouple unit T3; and that the companion pair of secondary windings 41*e* and 42*e* are connected in boosting or additive relation through the heating element of the thermocouple unit T4. Hence, the previously described condition or requirement of a number of thermocouples heated by a current proportional to $E+I$, opposed by an equal number fo thermocouples heated by a current proportional to $E-I$ is thus met, and the resultant direct current E. M. F. transmitted through output circuit 37 is proportional to $E \times I$ or instantaneous power. The output terminals of the thermocouple units T1–T4 are connected in opposition to each other across the output circuit 37. Thus, under a no-load condition with only the voltage secondaries 41*b*–41*e* energized, the four thermocouple heaters will be heated uniformly, and no direct current will be transmitted from the thermocouples over circuit 37 because the polarities of the four thermocouples are connected to oppose each other. However, as soon as current flow occurs in the load circuit, then the differential heating of the thermocouples occurs, which produces a proportionate direct current output in circuit 37.

Referring now to Figure 10, this circuit diagram illustrates the provision of circuit adjustments which are desirable or necessary in a commercial type of thermal converter. For example, variations in manufacture of the apparatus, variations in the heater resistances, inefficiency of couples, etc. necessitate adjustments to cause the output to be exactly zero when potential only or current only exists. In general, it may be shown that these errors are functions of the voltage squared or of the current squared. Furthermore, the instrument must be capable of calibration for various values of output ratio, i. e. millivolts output per watt input. In the indirectly-heated or separate heater type of thermal converter, such adjustments are usually provided for in the input circuits of the apparatus, and such input circuit adjustments may also be applied to our improved directly-heated type of thermal converter. In fact, we have shown such input circuit adjustments in the modified embodiment of our invention disclosed in Figure 13, to be later described. However, we find it preferable in the circuit embodiment of Figure 10 to provide all of these adjustments in the output circuits. In this embodiment of Figure 10, the potential transformer has six secondary windings 41*b*–41*g* for the main bank of six thermocouples T1–T6, and it also has two additional secondary windings 41*h* and 41*i* for the two potential adjusting thermocouple units T7 and T8. The current transformer 42 similarly has six secondary windings 42*b*–42*g* for companion connection, additively and subtractively, with the potential secondaries 41*b*–41*g*, respectively, through the main bank of thermocouple units T1–T6. In addition, the current transformer 42 has two more secondary windings 42*h* and 42*i* for energizing the current adjusting thermocouple units T9 and T10. The main group of potential secondaries 41*b*–41*g* and the main group of current secondaries 42*b*–42*g* have their polarities connected in alternating sequence through their respective thermocouple units T1–T6, so that the potential and current transformer voltages add or subtract in alternate heaters, the same as described above in connection with Figure 9. Referring now to the potential adjustment, the two thermocouple units T7 and T8 have their heater elements supplied individually from the secondary windings 41*h* and 41*i*, and these two thermocouple units are connected additively across the resistance element 44 of a voltage adjusting potentiometer 45. The sliding contact 46 of this potentiometer is connected through conductor 47 with one side of the direct current output circuit 37. Referring now to the current adjustment, the two thermocouple units T9 and T10 have their heater elements supplied individually from the secondary windings 42*h* and 42*i* of the current transformer 42, and the thermocouple elements in these two units are connected additively across the resistance element 48 of a current adjusting potentiometer 49. The shiftable contact 50 of this potentiometer is connected by way of conductor 51 with the shiftable tap 52 of a ratio adjusting potentiometer 53. The resistance 54 of this latter potentiometer has one end connected through conductor 56 with the end thermocouple unit T6 of the main bank of thermocouple units. The other end of resistance element 54 has connection through conductor 57 with the mid-point between thermocouple units T4 and T5; and also has connection through conductor 58 with switch contact 61 of the ratio selecting switch 60. A second contact 62 on this selecting switch has connection through conductor 64 with the mid-point between thermocouple units T2 and T3, and a third contact 63 on this switch has connection through conductor 65 with the end terminal of the thermocouple unit T1. The adjustable switch arm 66 of this ratio selecting switch 60 has connection with the other side of the direct current output circuit 37.

It will be seen from the foregoing that the voltage adjusting potentiometer 45 provides for effecting a potential balance of the thermal converter. By adjusting this voltage potentiometer, an E. M. F. is added into the output circuit 37 which is adjustable over positive and negative values and which varies as the square of the voltage. Since the errors introduced by irregularities of the circuit, as mentioned above, vary with the square of the voltage, they may be balanced out exactly by the adjustment of this potentiometer. Similarly, with regard to the current adjusting potentiometer 49, this potentiometer enables the converter to be provided with a corrective E. M. F. proportional to current squared. This is employed primarily to balance output readings, so that the converter will have the same output ratio on reverse as on direct power flow. Furthermore, with regard to ratio adjustment, the ratio adjusting potentiometer 53 and the ratio selecting switch 60 provide the thermal converter with a switching arrangement to permit cutting out a number of thermocouple units, so as to provide a wide range of adjustment, and also a fine adjustment, of the millivolts per watt output ratio.

Referring now to Figure 11 which shows a circuit wherein we deliberately introduce alternating current voltage to balance out alternating current pickup from the thermocouple units, it will be seen that this circuit is quite similar to the circuits of Figures 9 and 10 in that it employs a similar potential transformer 41 and a similar current transformer 42. The potential transformer 41 has the eight isolating secondary windings 41b–41i, inclusive, and the current transformer has its eight isolating secondary windings 42b–42i, inclusive. These secondary windings are connected with the heater elements of the ten thermocouple units T1 to T10, inclusive, in the same manner described above in connection with Figure 10. This circuit of Figure 11 also has the potential adjusting potentiometer 45, current adjusting potentiometer 49, and ratio adjusting potentiometer 53 connected in the circuit in substantially the same manner and for substantially the same purposes, as described above in connection with Figure 10. The ratio selecting switch 60 of Figure 10 has been omitted from Figure 11, in order to simplify the latter circuit diagram, but this ratio selecting switch may be employed in the same manner as previously described.

It will be seen from this circuit diagram that inasmuch as we have heater wires in these units carrying current proportional to E, E+I, E−I, and I, we have alternating current volts correspondingly across various heaters, and we may therefore have alternating current pickup proportional to any or all of these four quantities. If we remove the constantan couple wire from one couple corresponding to each of these four quantities and substitute a potentiometer across the heater, we still have a thermocouple circuit, since the heater is constantan also. In other words, the couple circuit divides and passes through the two halves of the heater in parallel and comes together again at the potentiometer brush or sliding contact. This is shown in Figure 11 wherein the heating element of thermocouple unit T1 is shunted by a potentiometer 71; the heating element of thermocouple unit T6 is shunted by potentiometer 72; the heating element of thermocouple unit T8 is shunted by a potentiometer 73; and the heating element of thermocouple unit T9 is shunted by potentiometer 74. The brush 71' of potentiometer 71 is connected to one side of the direct current output circuit 37; the brush 72' of potentiometer 72 is connected to one side of ratio adjusting potentiometer 53; the brush 73' of potentiometer 73 is connected to one side of the potential adjusting potentiometer 45; and the brush 74' of potentiometer 74 is connected to one side of the current adjusting potentiometer 49. Direct-current-wise, the position of the brush makes no difference, except in the circuit resistance; but alternating-current-wise, it must be electrically centered on the potentiometer if it is to avoid picking up some A. C. voltage. Suppose, for example, due to dissymmetry of some junctions of the E+I couples, there is a resultant A. C. voltage proportional to E+I in the couple circuit. The E+I potentiometer 71 may then be positioned to introduce an equal and opposite alternating current voltage and so eliminate E+I pickup. Practically, of course, this means four extra potentiometers per element and four additional adjustments to be made.

In Figure 12 we have illustrated a modified embodiment of thermocouple unit which we may employ instead of the thermocouple unit shown in Figures 3, 4 and 5 and used in the preceding embodiments. This modified construction consists of only three terminals or three arms instead of the four terminals or four arms of the preceding construction. The heater element of the thermocouple unit is represented by the resistance wire or like element A—B, which may be composed of constantan, as previously described. The thermocouple element comprises the laterally projecting arm C, preferably composed of molybdenum or Chromel and having a junction point with the heater element A—B at the point J. This latter arm C—J constitutes only one-half of the thermocouple element; the other half of the thermocouple element consists of one of the arms of the heater element A—B. Thus, we have provided a thermocouple junction consisting of molybdenum or Chromel for one-half of the couple and constantan for the other half of the couple, but in this instance the constantan half also constitutes part of the heater element. Thus, a portion of the thermocouple circuit is in common with a portion of the heater circuit, with the result that the alternating current impressed upon the heater element for heating the latter will introduce some alternating current components into the thermocouple circuit. However, our invention provides new and improved circuit arrangements for balancing out these alternating current components or preventing their disturbing the operation of the thermal converter objectionably, as we shall now describe in connection with Figure 13.

In Figure 13 we use substantially the same principle of balancing out the alternating current pickup described above in Figure 11, but the details of the converter circuit are considerably different in Figure 13 from those shown in Figure 11. The general arrangement of the input circuits in Figure 13 is somewhat similar to that of Figure 8 with the addition of a current transformer. The potential transformer 27 has its secondary 28 connected through circuit 31 with the primaries 34a and 35a of the isolating transformers 34' and 35'. However, in this embodiment, the center tap 29 on the potential transformer secondary 27 is connected through conductor 77 with one end of the secondary 79 of current transformer 78, which current transformer has its primary interposed in the line. In this embodiment of the invention, the balancing adjustments are provided in the input circuits which feed the thermocouple units, rather than in the output circuits of the thermocouple units. It will be seen that the other end of current transformer secondary 79 is connected through conductor 81 with the brush 83 of current balancing potentiometer 82, which has its resistance 84 interposed in the circuit 31 between the isolating or mixing transformers 34' and 35'. A potential adjusting circuit 85 also extends from brush 83 of the current balancing potentiometer to an adjustable shunt 86 comprising resistance 87 and shiftable contact 88. This potential adjusting circuit and shunt is shown as being connected in shunt of the E+I mixing transformer 34', but it might be connected in shunt of the E—I mixing transformer 35', as we shall later describe. Shunted across the secondary 79 of current transformer 78 is a temperature compensation 91 and a ratio adjustment 92 comprising a resistance 93 and shiftable contact 94.

The two isolating transformers 34 and 35 also function as mixing transformers in the present circuit, the transformer 34' being designated as an E+I mixing transformer, and the transformer 35' being designated as an E—I mixing transformer.

Referring now to the thermocouples and their heater circuits, the E+I mixing transformer 34' is arranged to heat a bank of eight thermocouple units T1 to T8, inclusive, and the E—I mixing transformer 35' is arranged to heat a second bank of eight thermocouple units T9 to T16, inclusive. As stated above, each of these thermocouple units is of the three-terminal or three-arm construction shown in Figure 12. The laterally projecting couple arm C—J of each unit connects with the heating element A—B of the next adjacent unit, either at the upper end of the heating element or at the lower end, as the case may be. Hence, the couples of each bank are all series connected, so that their direct currents add from unit to unit. The right hand ends of the upper and lower banks are connected together at 96, and the left hand ends are connected to the D. C. output circuit 37. The upper bank of thermocouple units is divided into two groups T1 to T4, inclusive, and T5 to T8, inclusive. The transformer secondaries 34b to 34e, inclusive, energize the heating elements of the first group T1 to T4, and have the positive terminals of their windings connected to the upper ends of the heating elements. Referring now to the second group, the secondaries 34f and 34i, inclusive, energize this second group T5 to T8, inclusive, but in this instance the positive terminals of their windings are connected to the opposite or lower ends of the heating elements. In this manner, the A. C. voltages in the couple circuits tend to balance. The same also applies to the lower bank of thermocouple units T9 to T16, inclusive. The secondaries 35b–35e have their positive terminals connected to the lower ends of the heating elements of thermocouples T9–T12, whereas the secondaries 35f–35i have their positive terminals connected to the upper ends of the heating elements of thermocouples T13–T16. Thus, the A. C. voltages in this lower bank of thermocouples also tend to balance.

To enable any remaining A. C. to be balanced out, a potentiometer is added across one heater in each bank, so that the couple circuit is completed through the potentiometer brush; since the A. C. pickup may be of either polarity, the potentiometer is arranged so that it may be connected across either of two heaters of opposite polarity. In the illustrated arrangement, an adjusting potentiometer 97 is connected across the heater of thermocouple unit T4 in the upper bank and an adjusting potentiometer 98 is connected across the heater element of thermocouple unit T16 in the lower bank. An alternate location of an alternating current adjusting potentiometer is indicated at 99, which can be arranged to be cut in or out by a switch 100.

In this circuit, the potential balance is adapted to be made by means of the adjustable shunt 86 arranged so that it may be connected across either mixing transformer 34' or 35', as required. In the illustrated arrangement, this potential adjustment is shown as it would be connected if the E+I bank, on potential only, had higher D. C. output than the E—I bank. With regard to current balance, this is effected through the potentiometer 82 which is connected to adjust the division of line current between the two mixing transformers 34' and 35'. With regard to ratio adjustment, this is obtained by the adjustable resistance 92 shunted across the secondary 79 of current transformer 78. In this latter embodiment of the invention, it may be desirable to provide temperature compensating means 91, such as a nickel shunt or the like, having a high temperature coefficient connected across the current transformer secondary 79, and preferably in series with the ratio adjustment 92.

As previously described, the heater elements of these three-terminal thermocouple units of Figure 12 are preferably constantan, but this is not essential. The single laterally extending leg C—J is preferably either molybdenum or Chromel, or some of the couples may be of one and some of the other. For example, we find it advantageous to use molybdenum as this laterally extending leg in three of the thermocouples in each half-bank of four, and to use Chromel in the fourth. This combination, in the proper proportions, and in the circuit of Figure 13, gives a flat load curve, since the molybdenum tends to give a rising curve and the Chromel a drooping curve.

While we have illustrated and described what we regard to be the preferred embodiments of our invention, nevertheless, it will be understood that such are merely exemplary and that numerous modifications and rearrangements may be made therein without departing from the essence of the invention.

We claim:

1. In apparatus of the class described, the combination of a plurality of thermocouple units, each of said units comprising a thermocouple element composed of two wires of dissimilar metals having end-to-end junction, and a heating element having direct heating contact therewith at said junction and extending substantially at right angles to both of said wires, isolating transformer windings for energizing said heating elements in conductively isolated relation, said thermocouple elements being connected in series opposing, and an output circuit fed from said thermocouple elements.

2. In apparatus of the class described, the combination of a plurality of thermocouple units, each of said units comprising a thermocouple element and a heating element having direct heating contact therewith, isolating transformer windings for supplying alternating current to said heating elements in conductively isolated relation, said thermocouple elements being connected in series opposing pairs, and a direct current output circuit leading from said thermocouple elements.

3. In apparatus of the class described, the combination of a plurality of thermocouple units, each of said units comprising a thermocouple junction composed of two wires of dissimilar metals in end-to-end abutment and a heating element having direct heating contact with said junction and extending substantially at right angles to both wires, and isolating transformer windings for energizing different heating elements proportionate to different electrical functions being measured, said thermocouple elements being connected in series opposing pairs, and a direct current output circuit feed from said thermocouple elements.

4. In apparatus of the class described for measuring power transmitted over an alternating current line to load apparatus, the combination of a plurality of thermocouple units, each of said units comprising a thermocouple element and a heating element having direct heating contact therewith, isolating transformer secondaries for energizing the heating element of one thermocouple unit proportionate to one function of a load current transmitted over said alternating current line to said load apparatus and for energizing the heating element of another thermocouple unit proportionate to another function of said load current, and an output circuit connecting with said thermocouple elements in opposition.

5. In a thermal converter for measuring the power transmitted over an alternating current line to load apparatus, the combination of a plurality of thermocouple units each comprising a thermocouple element and a heating element having direct heat transmitting contact at one point only, and with the thermocouple element extending substantially at right angles to the heating element, means for energizing different heating elements of different thermocouple units proportionate to different electrical functions of the power being transmitted over said alternating current line to said load apparatus, an output circuit connected with said thermocouple element, and means for balancing out errors due to dissymmetry of heater elements and thermocouple elements by the introduction in series of a portion of the electromotive force generated by thermocouple units heated respectively by currents proportional to the line voltage and to the line current transmitted to said load apparatus.

6. In a thermal converter for measuring the power transmitted over an alternating current line to load apparatus, the combination of heater means and thermocouple means in direct heat transmitting contact, input circuit means connected with said alternating current line for energizing said heater means proportionately to the input watts supplied to said load apparatus, and output circuit means transmitting an output E. M. F. from said thermocouple means, said heater and said thermocouple means comprising a plurality of conductor materials, one having a positive and another a negative temperature coefficient of thermal conductivity so that the relation between input watts and output E. M. F. may be altered in design or in manufacture by so changing the dimensions of the conductors comprising the heater means or the thermocouple means as to change the proportion of the conductive heat flow through each material.

7. In a thermal converter for measuring the power transmitted over an alternating current line to load apparatus, the combination of heater means and thermocouple means in direct heat transmitting contact, input circuit means connected with said alternating current line for energizing said heater means proportionately to the input watts supplied to said load apparatus, and output circuit means transmitting an output E. M. F. from said thermocouple means, said heater means being composed of constantan and said thermocouple means being composed of constantan and molybdenum having positive and negative temperature coefficients of thermal conductivity so that the relation between input watts and output E. M. F. may be altered by so changing the dimensions of the constantan or molybdenum as to change the proportion of the conductive heat flow through each material.

8. In apparatus of the class described for measuring the power transmitted over an alternating current line to load apparatus, the combination of a plurality of thermocouple units, each of said units comprising a thermocouple element and a heating element having direct heating contact therewith, means for causing said heating element to be heated substantially in proportion to the input watts transmitted to said load apparatus, said elements comprising a plurality of conductor materials of substantially different coefficients of thermal conductivity, whereby the relation between said input watts and the output E. M. F. from the thermocouple element may be altered in design or in manufacture by so changing the dimensions of the conductors comprising the heater and thermocouple elements as to change the proportion of conductive heat flow through each material.

9. In a thermal converter for measuring power transmitted over an alternating current line to load apparatus, the combination of a plurality of main thermocouple units each comprising a thermocouple element and a heating element having direct heating contact therewith, input circuit means supplied by said alternating current line for energizing said heating elements proportional to the line voltage and line current transmitted to said load apparatus, output circuit means transmitting a main E. M. F. from said main thermocouple elements, and adjusting thermocouple units heated respectively by currents proportional to the line voltage and the line current transmitted to said load apparatus and operative to produce an adjusting E. M. F. adapted to be introduced in series in said output circuit for balancing out errors due to dissymmetry of heating elements and thermocouple elements of said main thermocouple units.

10. In a thermal converter for measuring power transmitted over an alternating current line to load apparatus, the combination of a plurality of main thermocouple units each comprising a thermocouple element and a heating element having direct heating contact therewith, input circuit means supplied by said alternating current line for energizing said heating elements proportional to the line voltage and line current transmitted to said load apparatus, output circuit means transmitting a main E. M. F. from said main thermocouple elements, adjusting thermocouple units heated respectively by currents proportional to line voltage squared and line current squared for producing an adjusting E. M. F., and means operative to introduce that adjusting E. M. F. in series with the main E. M. F. from said main thermocouple units for balancing out errors due to dissymmetry of the heater and thermocouple elements of said main thermocouple units.

11. In a thermal converter for measuring power transmitted over an alternating current line to load apparatus, the combination of a plurality of thermocouple units each comprising a thermocouple element and a heating element having direct heating contact therewith, input circuit means supplied by said alternating current line for energizing said heating elements proportional to the line voltage and line current transmitted to said load apparatus, output circuit means transmitting a D. C. E. M. F. from said thermocouple elements, and means for balancing out substantially any A. C. component which may be present in the D. C. E. M. F. of said output circuit.

12. In a thermal converter for measuring power transmitted over an alternating current line to load apparatus, the combination of a plurality of main thermocouple units each comprising a thermocouple element and a heating element having direct heating contact therewith, input circuit means supplied by said alternating current line for energizing said heating elements proportional to the line voltage and line current transmitted to said load apparatus, output circuit means transmitting a main E. M. F. from said main thermocouple elements, adjusting thermocouple units heated respectively by current proportional to the line voltage and to the line current transmitted to said load apparatus and operative to produce an adjusting E. M. F., and potentiometer means cooperating with said adjusting thermocouple units for balancing out substantially any A. C. component which may be present in the D. C. output of said output circuit.

13. In a thermal converter for measuring the power transmitted over an alternating current power line to load apparatus, the combination of a potential transformer connected across said line, said transformer having a center tap secondary, a loop circuit having one end connected with the end terminals of said secondary, isolating transformers connected in separate legs of said loop circuit, said loop circuit having a mid tap in its other end between said isolating transformers, said power line having one conductor connected to the center tap of said potential transformer secondary and a continuation of said latter conductor extending from said mid tap at the end of said loop circuit, whereby the current load transmitted over said alternating current power line to said load apparatus divides and passes through the two legs of said loop circuit, separate heating circuits extending from the secondaries of said isolating transformers, thermocouple units comprising heater elements and couple elements, said heater elements being energized from said heating circuits, and an output circuit in which the couple elements are connected in series opposition.

14. In a thermal converter for measuring the power transmitted over an alternating current power line to load apparatus, the combination of a potential transformer connected across said power line, a current transformer connected in series in said power line, said potential transformer having a series of isolating potential secondaries and said current transformer having a corresponding series of isolating current secondaries, a series of thermocouple units each comprising a heater element and a couple element, separate heating circuits electrically connecting an isolating potential secondary and an isolating current secondary with each heater element, one group of heating circuits having their potential and current secondaries connected additively, and another group of heating circuits having their potential and current secondaries connected subtractively, and a direct current output circuit in which said couple elements are connected in series opposing pairs.

15. In a thermal converter for measuring the power transmitted over an alternating current power line to load apparatus, the combination of a potential transformer connected across said line, a current transformer connected in series in said line, said potential transformer having a plurality of isolating potential secondaries and said current transformer having a corresponding series of isolating current secondaries, a main bank of thermocouple units, a potential adjusting thermocouple unit and a current adjusting thermocouple unit all having heater elements and couple elements heated thereby, separate heating circuits for the heater elements of said main bank of thermocouple units, said separate heating circuits electrically connecting an isolating potential secondary and an isolating current secondary with each heater element, one group of said latter heating circuits having their potential and current secondaries connected additively and another group of said latter heating circuits having their potential and current secondaries connected subtractively, a direct current output circuit in which the couple elements of said main bank of thermocouple units are connected in opposition, a heating circuit for said potential adjusting thermocouple unit energized from an isolating potential secondary of said potential transformer, a heating circuit for the heater element of said current adjusting thermocouple unit energized from an isolating current secondary of said current transformer, and potentiometer means connecting said potential adjusting thermocouple unit and said current adjusting thermocouple unit with said output circuit for adjusting the direct current output therein.

16. In a thermal converter for measuring the power transmitted over an alternating current power line to load apparatus, the combination of a potential transformer connected across said line, a current transformer connected in series in said line, said potential transformer having a plurality of isolating potential secondaries and said current transformer having a corresponding series of isolating current secondaries, a main bank of thermocouple units, a potential adjusting thermocouple unit and a current adjusting thermocouple unit all having heater elements and couple elements heated thereby, separate heating circuits for the heater elements of said main bank of thermocouple units, said separate heating circuits electrically connecting an isolating potential secondary and an isolating current secondary with each heater element, one group of said latter heating circuits having their potential and current secondaries connected additively and another group of said latter heating circuits having their potential and current secondaries connected subtractively, a direct current output circuit in which the couple elements of said main bank of thermocouple units are connected in opposition, a heating circuit for said potential adjusting thermocouple unit energized from an isolating potential secondary of said potential transformer, a heating circuit for the heater element of said current adjusting thermocouple unit energized from an isolating current secondary of said current transformer, a voltage adjusting potentiometer connected across said potential adjusting thermocouple unit and connected to one side of said output circuit, a current adjusting potentiometer connected across said current adjusting thermocouple unit and connected with the other side of said output circuit, and ratio selecting means having ratio selecting tap connections at different points in said main bank of thermocouple units for varying the ratio of the output over said output circuit.

17. In a thermal converter for measuring the power transmitted over an alternating current power line to load apparatus, the combination of a potential transformer connected across said line, a current transformer connected in series in said power line, said potential transformer having a series of isolating potential secondaries and said current transformer having a corresponding series of isolating current secondaries, a main bank of thermocourle units, a potential adjusting thermocouple unit and a current adjusting thermocouple unit all having heater elements and couple elements heated thereby, a main bank of heating circuits for said main bank of thermocouple units, each of said heating circuits electrically connecting an isolating potential secondary and an isolating current secondary with the heater element of one of said main bank thermocouple units, one-half of said latter heating circuits having their potential and current secondaries connected additively to be proportional to the voltage plus current of the power line, the other half of said latter heating circuits having their potential and current secondaries connected subtractively to be proportional to the voltage minus current of the power line, a voltage plus current adjusting potentiometer connected across the heater element of a voltage plus current thermocouple unit at one end of said bank, a voltage minus current adjusting potentiometer connected across the heater element of a voltage minus current thermocouple unit at the other end of said bank, the couple elements of the voltage plus current units being connected in opposition with the couple elements of the voltage minus current units, and an output circuit connected with said potentiometers.

18. In a thermal converter for measuring the power transmitted over an alternating current power line to load apparatus, the combination of a potential transformer connected across said line, a current transformer connected in series in said power line, said potential transformer having a series of isolating potential secondaries and said current transformer having a corresponding series of isolating current secondaries, a main bank of thermocouple units, a potential adjusting thermocouple unit and a current adjusting thermocouple unit all having heater elements and couple elements heated thereby, a main bank of heating circuits for said main bank of thermocouple units, each of said heating circuits electrically connecting an isolating potential secondary and an isolating current secondary with the heater element of one of said main bank thermocouple units, one-half of said latter heating circuits having their potential and current secondaries connected additively to be proportional to the voltage plus current of the power line, the other half of said latter heating circuits having their potential and current secondaries connected substractively to be proportional to the voltage minus current of the power line, a voltage plus current adjusting potentiometer connected across the heater element of a voltage plus current thermocouple unit at one end of said bank, a voltage minus current adjusting potentiometer connected across the heater element of a voltage minus current thermocouple unit at the other end of said bank, the couple elements of the voltage plus current units being connected in opposition with the couple elements of the voltage minus current units, a separate heater circuit energized from one of said isolating potential secondaries, a voltage adjusting thermocouple unit having its heater element energized by said latter heater circuit, a voltage adjusting potentiometer connected across said heater element, a separate heater circuit energized from one of said isolating current secondaries, a current adjusting thermocouple unit having its heater element energized from said latter heater circuit, a current adjusting potentiometer connected across the heater element of said latter thermocouple unit, and an output circuit connected with said adjusting potentiometers.

19. In a directly heated thermocouple unit, the combination of a heater element composed of constantan adapted to be energized by alternating current, and a thermocouple element of molybdenum or Chromel, said thermocouple element having a thermocouple junction with an intermediate point of said heater element and projecting laterally therefrom, the output circuit of said thermocouple unit passing through said laterally projecting thermocouple unit and longitudinally through said heater element.

20. In a directly heated thermocouple unit of the three arm type, the combination of a heater element adapted to be energized by alternating current, and a thermocouple element having a thermocouple junction with an intermediate point of said heater element and projecting laterally therefrom, the output circuit of said thermocouple unit passing through said laterally projecting thermocouple unit and longitudinally through said heater element.

21. In a thermal converter for measuring the power transmitted over an alternating current power line to load apparatus, the combination of a potential transformer connected across the power line, a current transformer connected in series in said power line, said potential transformer having a center tap secondary, a loop circuit having one end connected with the end terminals of said potential secondary, a voltage plus current mixing transformer having its primary connected in one leg of said loop circuit, a voltage minus current mixing transformer having its primary connected in the other leg of said loop circuit, said loop circuit having a mid tap in its other end between said mixing transformers, said current transformer having its secondary connected to the center tap of the potential transformer secondary and to the mid tap of said loop circuit, two groups of isolating secondaries on said voltage plus current mixing transformer, two groups of thermocouple units energized by said two groups of isolating secondaries, each of said thermocouple units comprising a heater element and a thermocouple element, said thermocouple elements being connected in series from one unit to the next, one group of said thermocouple units being connected to their isolating secondaries in one polarity so that their heating currents pass through the heating elements in one direction, and the other group of said thermocouple units being connected to their isolating secondaries in the opposite polarity so that their heating currents pass through the heating elements in the opposite direction, two groups of isolating secondaries in said voltage minus current mixing transformer, two groups of thermocouple units energized thereby, said two latter groups of thermocouple units likewise comprising heater elements and thermocouple elements, with the thermocouple elements connected together in series from unit to unit, one of said latter group of thermocouple units being connected to their isolating secondaries in one polarity so that their heating currents pass through the heating elements in one direction, the other group of said latter thermocouple units being connected to their isolating secondaries in the opposite polarity so that their heating currents pass through the heating elements in the opposite direction, and an output circuit connected with said four groups of thermocouple units.

22. A thermal converter of the construction defined in claim 21 further characterized by a current balancing potentiometer, a voltage adjustment, and a ratio adjustment.

23. In apparatus of the class described, the combination of a plurality of thermocouple units, each of said units comprising thermocouple means and heater means having direct heating contact therewith, isolating transformer windings for energizing said heater means in conductively isolated relation, and an output circuit fed from said thermocouple means, in each of said thermocouple units said heater means and said thermocouple means comprising a plurality of conductor materials of substantially differing temperature coefficients of thermal conductivity so that the relation between input watts fed to said heater means and output E. M. F. delivered from said thermocouple means may be altered in design or in manufacture by so changing the dimensions of the conductors comprising the heater means or the thermocouple means as to change the proportion of the conductive heat flow through each material.

24. In apparatus of the class described, the combination of a plurality of thermocouple units, each of said units comprising thermocouple means and heater means having direct heating contact therewith, isolating transformer windings for supplying alternating current to said heating elements in conductively isolated relation, said thermocouple elements being connected in series opposition, and a direct current output circuit leading from said thermocouple elements, in each of said thermocouple units said heater means being composed of constantan and molybdenum having substantially different temperature coefficients of thermal conductivity so that the relation between input watts fed to said heater means and output E. M. F. delivered from said thermocouple means may be altered by so changing the dimensions of the constantan or molybdenum as to change the proportion of the conductive heat flow through each material.

25. In apparatus of the class described, the combination of a plurality of thermocouple units, each of said units comprising a thermocouple element and a heating element having direct heating contact therewith, isolating transformer windings for energizing different heating elements proportionate to different electrical functions being measured, and a direct current output circuit fed from said thermocouple elements, said elements comprising a plurality of conductor materials of substantially different coefficients of thermal conductivity, whereby the relation between input watts fed to said heating element and output E. M. F. delivered from said thermocouple element may be altered in design or in manufacture by so changing the dimensions of the conductors comprising the heater and thermocouple elements as to change the proportion of conductive heat flow through each material.

26. In apparatus of the class described, the combination of a plurality of thermocouple units, each of said units comprising a thermocouple element and a heating element having direct heating contact therewith, isolating transformer windings for supplying alternating current to said heating elements in conductively isolated relation, and a direct current output circuit leading from said thermocouple elements, in each of said thermocouple units said thermocouple element and said heating element having direct heat transmitting contact at one point only and having the thermocouple element extending substantially at right angles to the heating element, whereby to prevent or minimize the transfer of an alternating current component from the alternating current circuit of the heating element to the direct current circuit of the thermocouple element.

27. In apparatus of the class described, the combination of a plurality of thermocouple units, each of said units comprising a thermocouple element and a heating element having direct heating contact therewith, isolating transformer windings for supplying alternating current to said heating elements in conductively isolated relation, said thermocouple elements being connected in series opposing pairs, and a direct current output circuit leading from said thermocouple elements, in each of said thermocouple units said thermocouple element and said heating element having direct heat transmitting contact at one point only and having the thermocouple element extending substantially at right angles to the heating element, substantially in the form of a right angle cross, whereby to prevent or minimize the transfer of an alternating current component from the alternating current circuit of the heater element to the direct current circuit of the thermocouple element, said heater element and thermocouple element comprising a plurality of conductor materials of substantially different temperature coefficients of thermal conductivity so that the relation between input watts and output E. M. F. may be altered in design or in manufacture by so changing the dimensions of the conductors comprising the heater means or the thermocouple means as to change the proportion of the conductive heat flow through each material.

WILLIAM C. DOWNING, JR.
DONALD A. EGGLESTON.
JAMES M. VANDERLECK.

REFERENCES CITED

The following references are of record in the file of this patent:

UNITED STATES PATENTS

| Number | Name | Date |
|---|---|---|
| 1,456,591 | Goodwin | May 29, 1923 |
| 1,588,525 | Chubb | June 15, 1926 |
| 1,620,126 | Paine | Mar. 8, 1927 |
| 2,059,594 | Massa | Nov. 3, 1936 |
| 2,169,101 | Pierre | Aug. 8, 1939 |
| 2,177,502 | Stack | Oct. 24, 1939 |
| 2,285,211 | Korman | June 2, 1942 |
| 2,366,844 | Doschek | Jan. 9, 1945 |
| 2,444,027 | Becker et al. | June 29, 1948 |